US008833983B2

(12) United States Patent
Chang et al.

(10) Patent No.: US 8,833,983 B2
(45) Date of Patent: Sep. 16, 2014

(54) LIGHT EMITTING DIODE LAMP

(75) Inventors: Wen-Chiao Chang, Hsin-Chu (TW);
Fang-Ru Ye, Hsin-Chu (TW);
Yao-Cheng Lue, Hsin-Chu (TW);
Chen-Wei Chu, Hsin-Chu (TW); Udo Custodis, Hsin-Chu (TW)

(73) Assignee: Young Lighting Technology Inc., Hsin-Chu (TW)

( * ) Notice: Subject to any disclaimer, the term of this patent is extended or adjusted under 35 U.S.C. 154(b) by 214 days.

(21) Appl. No.: 13/398,856

(22) Filed: Feb. 17, 2012

(65) Prior Publication Data
US 2012/0294035 A1 Nov. 22, 2012

(30) Foreign Application Priority Data
May 20, 2011 (CN) .......................... 2011 1 0135835

(51) Int. Cl.
*F21V 21/30* (2006.01)
(52) U.S. Cl.
USPC ............ 362/421; 362/236; 362/246; 362/269
(58) Field of Classification Search
USPC ......... 362/236, 238, 239, 240, 246, 269, 287, 362/421, 427, 428
See application file for complete search history.

(56) References Cited

U.S. PATENT DOCUMENTS

| 5,685,637 | A | * | 11/1997 | Chapman et al. | 362/236 |
|---|---|---|---|---|---|
| 5,736,686 | A | * | 4/1998 | Perret et al. | 178/18.11 |
| 6,315,432 | B1 | | 11/2001 | Kuo | |
| 6,966,679 | B2 | * | 11/2005 | Matts et al. | 362/418 |
| 7,090,375 | B2 | * | 8/2006 | Kuisma | 362/246 |
| 7,880,637 | B2 | * | 2/2011 | Weiss | 362/236 |
| 8,172,436 | B2 | * | 5/2012 | Coleman et al. | 362/421 |
| 2006/0092635 | A1 | * | 5/2006 | Schaak et al. | 362/236 |
| 2008/0030691 | A1 | * | 2/2008 | Godo | 362/269 |

FOREIGN PATENT DOCUMENTS

| CN | 2847019 | 12/2006 |
|---|---|---|
| CN | 201521828 | 7/2010 |
| CN | 102052585 | 5/2011 |
| JP | 02-197005 | 8/1990 |
| TW | M303327 | 12/2006 |
| TW | 200835887 | 9/2008 |
| TW | 200946834 | 11/2009 |

OTHER PUBLICATIONS

"Office Action of China Counterpart Application", issued on Nov. 1, 2013, p. 1-p. 7, in which the listed references were cited.

* cited by examiner

*Primary Examiner* — Y My Quach Lee
(74) *Attorney, Agent, or Firm* — Jianq Chyun IP Office

(57) ABSTRACT

An LED lamp including a first light source device and a second light source device is provided. The first light source device has a light exiting surface and a connection portion, and is used for emitting a first illumination light through the light exiting surface. The light exiting surface surrounds the connection portion. The second light source device is connected to the connection portion, and is used for emitting a second illumination light.

22 Claims, 6 Drawing Sheets

LIGHT EMITTING DIODE LAMP

CROSS-REFERENCE TO RELATED APPLICATION

This application claims the priority benefit of China application serial no. 201110135835.4, filed on May 20, 2011. The entirety of the above-mentioned patent application is hereby incorporated by reference herein and made a part of this specification.

BACKGROUND OF THE INVENTION

1. Field of the Invention

The invention relates to a lamp. Particularly, the invention relates to a light-emitting diode (LED) lamp.

2. Description of Related Art

A light-emitting diode (LED) is a semiconductor device, and a material of a light emitting chip thereof is mainly a compound of III-V group chemical elements, for example, gallium phosphide (GaP) or gallium arsenide (GaAs), and a light-emitting principle of the LED is to convert electric energy into light energy. In detail, by applying a current to the compound semiconductor, excessive energy is released in form of light through combination of electrons and holes. Since the light-emitting principle of the LED is not to emit light through heating or discharging, a service life of the LED may be more than one hundred thousand hours. Moreover, the LED further has advantages of fast response speed, small size, low power consumption, low pollution, high reliability and suitable for mass production, etc., so that the LED has a very wide application range, which may be used as a light source for large-scale billboards, traffic lights, mobile phones, scanners, fax machines and LED lamps, etc.

Taking the LED lamp as an example, the LED lamp may have a divergent light source or a convergent light source according to a light shape thereof. The divergent light source is generally used for environmental lighting, and the convergent light source is used for lighting a specific object. Presently, most of the LED lamps have a single light shape, and when the environmental lighting and lighting of the specific object are simultaneously required, besides the LED lamp having the divergent light source is installed, the LED lamp having the convergent light source is also required, which may occupy relatively more space, and a circuit layout thereof is relatively complicated.

Taiwan patent publication No. 200946834 discloses a lighting device, in which a transparent reflection cover is a high optical material containing light divergent micro-particles, which strengthens a refraction and diffusion effect of the light and increases a horizontal light emitting effect. Taiwan patent No. M303327 discloses a lamp base, and an LED light source is disposed at a side of a light emitting plate, so as to provide even planar light source through the light emitting plate. Taiwan patent publication No. 200835887 discloses a lighting apparatus, in which a light guiding layer has a plurality of pores, and the LED light sources are respectively disposed in the pores, and the light emitted from the LED light source enters the light guiding layer and emits to external through a bottom surface of the light guiding layer. U.S. Pat. No. 6,315,432 discloses an LED device, in which a spherical container is spherically connected to a positioning base, and the LED light source is contained in the spherical container, and a lighting direction thereof is adjusted along with rotation of the spherical container.

SUMMARY OF THE INVENTION

The invention is directed to a light-emitting diode (LED) lamp, which is capable of emitting two illumination lights.

Additional aspects and advantages of the invention will be set forth in the description of the techniques disclosed in the invention.

To achieve one of or all aforementioned and other advantages, an embodiment of the invention provides an LED lamp including a first light source device and a second light source device. The first light source device has a light exiting surface and a connection portion, and is used for emitting a first illumination light through the light exiting surface. The light exiting surface surrounds the connection portion. The second light source device is connected to the connection portion, and is used for emitting a second illumination light.

To achieve one of or all aforementioned and other advantages, an embodiment of the invention provides an LED lamp including a first light source device a connection member and a second light source device. The first light source device has a light exiting surface and a connection portion, and is used for emitting a first illumination light through the light exiting surface. The light exiting surface surrounds the connection portion. The connection member is connected to the connection portion. The second light source device is connected to the connection member, and is used for emitting a second illumination light.

According to the above descriptions, the LED lamp of the invention has at least one of the following advantages:

In the above embodiments of the invention, the first light source device and the second light source device are respectively used to emit the first illumination light and the second illumination light. Therefore, a single lamp may have an effect of emitting two illumination lights, so as to save a configuration space of the lamp and simplify a circuit layout.

Other objectives, features and advantages of the invention will be further understood from the further technological features disclosed by the embodiments of the invention wherein there are shown and described preferred embodiments of the invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention may be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
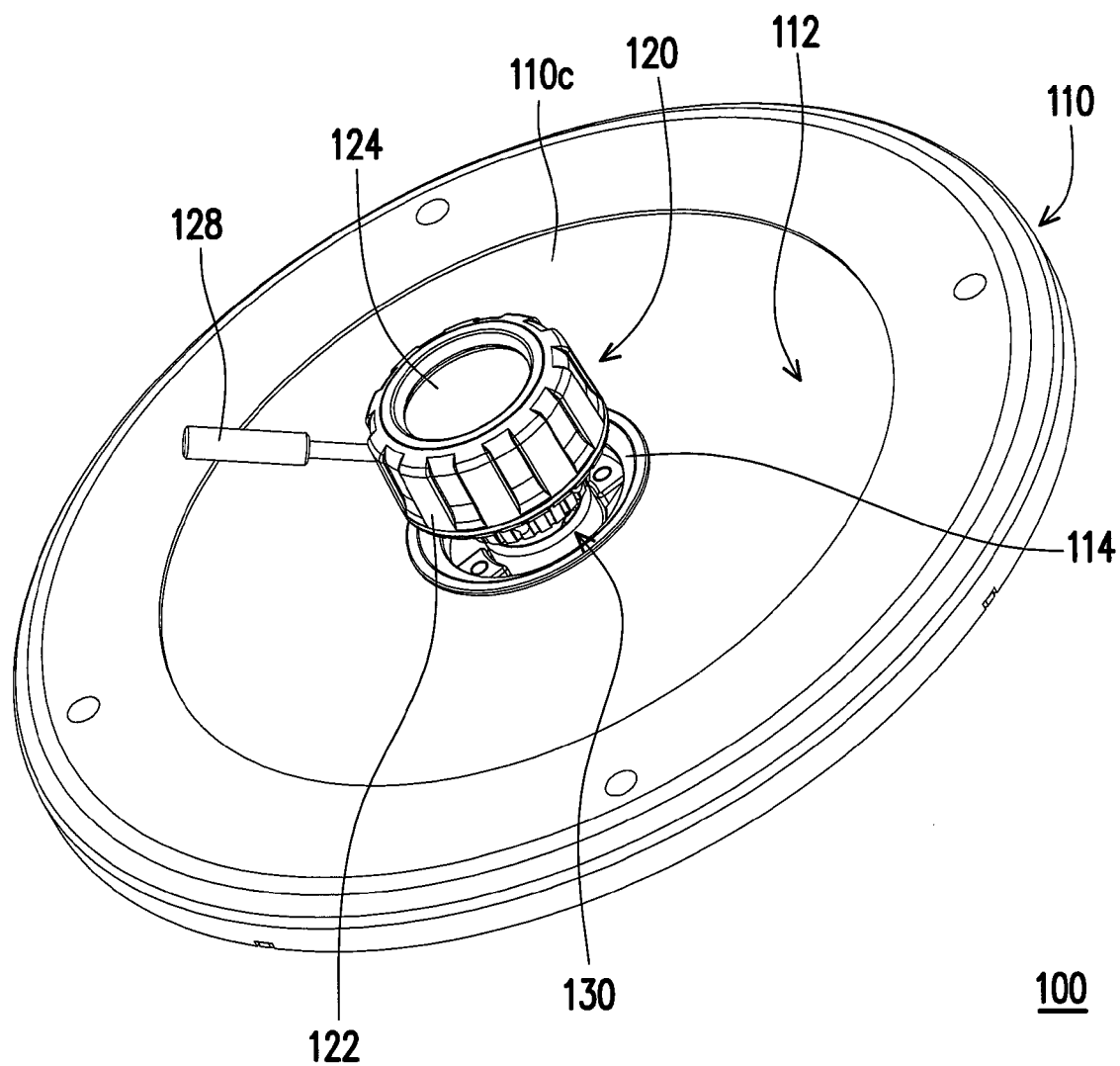
FIG. 1 is a three-dimensional view of a light-emitting diode (LED) lamp according to an embodiment of the invention.

FIG. 1 is a three-dimensional view of a light-emitting diode (LED) lamp according to an embodiment of the invention. Referring to FIG. 1, the LED lamp 100 of the embodiment includes a first light source device 110 and a second light source device 120. The first light source device 110 has a light exiting surface 112 and a connection portion 114, where the light exiting surface 112 surrounds the connection portion 114, and the second light source device 120 is connected to the connection portion 114.

Figure 2A:
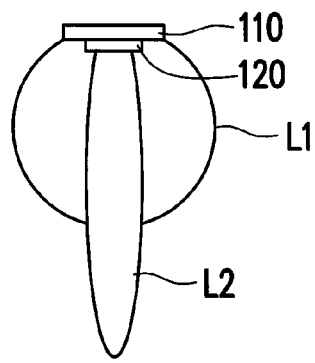
FIGS. 2A-2C are schematic diagrams illustrating lighting effects of the LED lamp of FIG. 1.
Figure 2B:
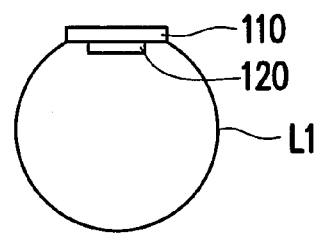
Figure 2C:
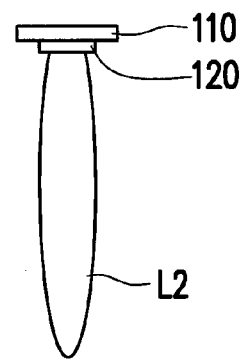

FIGS. 2A-2C are schematic diagrams illustrating lighting effects of the LED lamp of FIG. 1. Referring to FIG. 1 to FIG. 2C, the first light source device 110 of the embodiment is, for example, a divergent light source device and is used for emitting a first illumination light L1 having a divergent light shape, and the second light source device 120 of the embodiment is, for example, a convergent light source device and is used for emitting a second illumination light L2 having a convergent light shape. Since the first light source device 110 and the second light source device 120 are integrated as one unit, and respectively emit the first illumination light L1 and the second illumination light L2, the single LED lamp may have an effect of emitting different illumination lights, so as to save a configuration space of the lamp and simplify a circuit layout. In the embodiment, the connection portion 114 is, for example, located at a geometric center of the light exiting surface 112, though the invention is not limited thereto, and in other embodiments, the connection portion 114 may be located at other suitable positions on the light exiting surface 112.

The LED lamp 100 of the embodiment may be used in an occasion of exhibiting merchandise and exhibitions. The first illumination light L1 of the first light source device 110 is used for environmental lighting, and the second illumination light L2 of the second light source device 120 is used for lighting a specific object. A user may turn on the first light source device 110 for environmental light as that shown in FIG. 2B, turn on the second light source device 120 for lighting the specific object as that shown in FIG. 2C, or turn on both of the first light source device 110 and the second light source device 120 for simultaneously lighting the environment and lighting the specific object according to an illumination requirement.

Types of the illumination lights emitted by the first light source device 110 and the second light source device 120 are not limited, the first illumination light L1 emitted by the first light source device 110 and the second illumination light L2 emitted by the second light source device 120 may be different in at least one of a light shape, a color temperature and a color. In other words, besides the first light source device 110 and the second light source device 120 are designed to emit illumination lights of different light shapes as that shown in FIG. 2A, in other embodiments, the first light source device 110 and the second light source device 120 may be designed to emit illumination lights of different color temperatures or colors, so as to provide various illumination effects according to actual utilization requirements.

Figure 3:
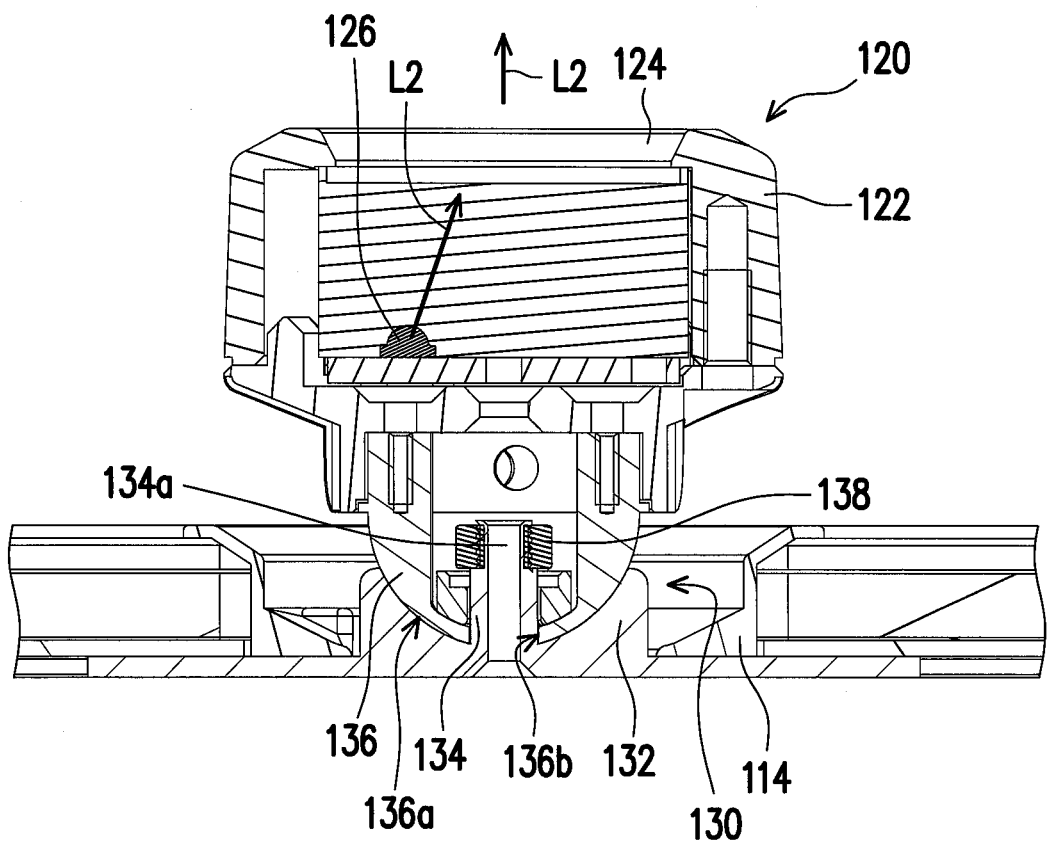
FIG. 3 is a partial cross-sectional view of the LED lamp of FIG. 1.

FIG. 3 is a partial cross-sectional view of the LED lamp of FIG. 1. Referring to FIG. 1 and FIG. 3, in detail, the second light source device 120 of the embodiment includes a casing 122, a light convergent lens 124 and an LED light source 126. The casing 122 is connected to the connection portion 144, and the light convergent lens 124 and the LED light source 126 are disposed in the casing 122. The LED light source 126 emits the second illumination light L2, and the second illumination light L2 is transmitted to external through the light convergent lens 124.

Figure 4:
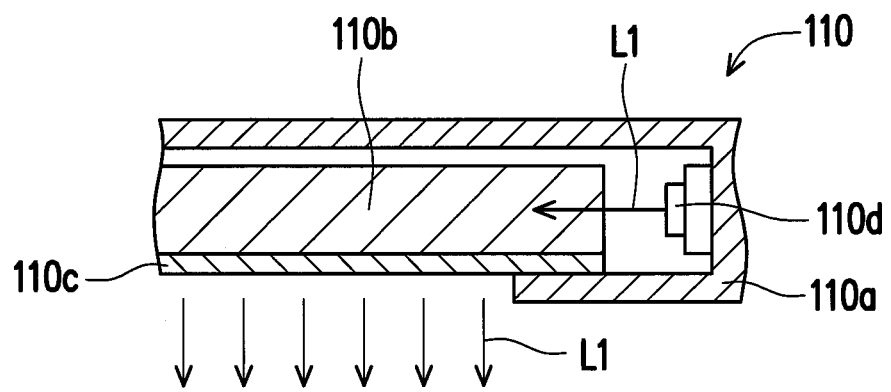
FIG. 4 is a partial cross-sectional view of a first light source device of FIG. 1.
Figure 5:
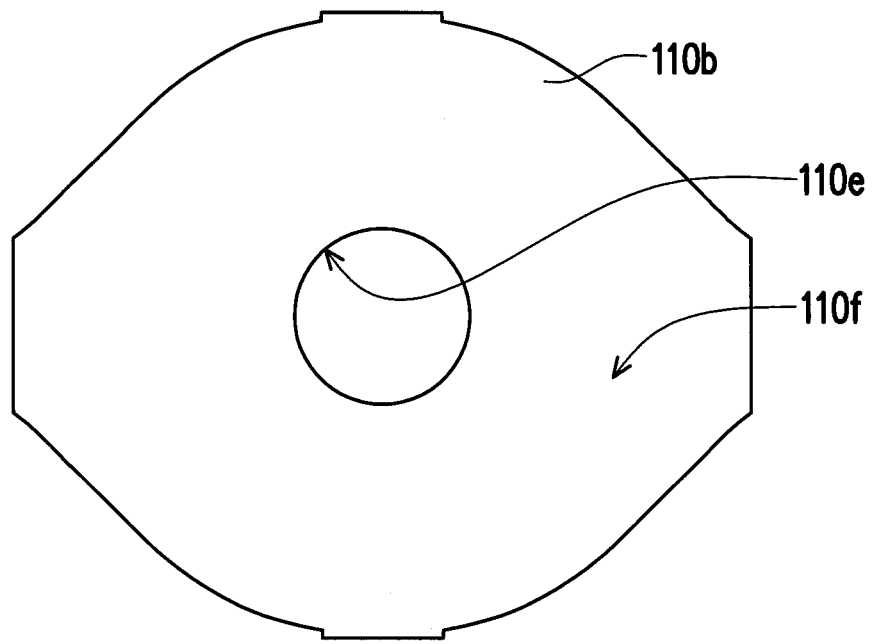
FIG. 5 is a top view of a light guiding plate of FIG. 4.

FIG. 4 is a partial cross-sectional view of the first light source device 110 of FIG. 1. Referring to FIG. 1 and FIG. 4, in detail, the first light source device 110 of the embodiment is a side-type divergent light source device and includes a base body 110a, a light guiding plate 110b, a diffusion plate 110c and an LED light source 110d. The light guiding plate 110b is disposed in the base body 110a, the diffusion plate 110c covers the light guiding plate 110b, and the LED light source 110d is disposed in the base body 110a and located close to a side of the light guiding plate 110b. The LED light source 110d emits the first illumination light L1, and the first illumination light L1 sequentially passes through the light guiding plate 110b and the diffusion plate 110c to reach external. FIG. 5 is a top view of the light guiding plate of FIG. 4. Referring to FIG. 5, the light guiding plate 110b of the embodiment has a hole 110e for exposing the connection portion 114 (shown in FIG. 1). Moreover, a surface 110f of the light guiding plate 110b may be designed to have a plurality of lattice points to even the light emitted there from.

Figure 6:
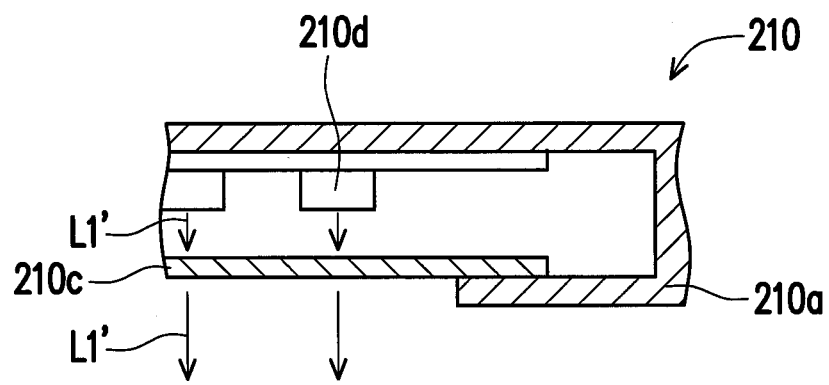
FIG. 6 is a partial cross-sectional view of a first light source device according to another embodiment of the invention.

A type of the first light source device 110 is not limited by the invention, besides the side-type divergent light source device of FIG. 4, the first light source device 110 may also be a direct-under type divergent light source device, as that shown in FIG. 6. FIG. 6 is a partial cross-sectional view of the first light source device according to another embodiment of the invention. Referring to FIG. 6, the first light source device 210 of the embodiment is the direct-under type divergent light source device and includes a base body 210a, a diffusion plate 210c and an LED light source 210d. The diffusion plate 210c is disposed on the base body 210a, and the LED light source 210d is disposed in the base body 210a. The LED light source 210d emits a first illumination light L1', and the first illumination light L1' is transmitted to external through the diffusion plate 210c.

As shown in FIG. 1, the second light source device 120 is connected to the connection portion 114 through a connection member 130, and the connection member 130 is, for example, a universal joint, so that the second light source device 120 may be rotated relative to the first light source device 100 to adjust a light emitting angle thereof Construction of the connection member 130 is described in detail below with reference of figures.

Figure 7:
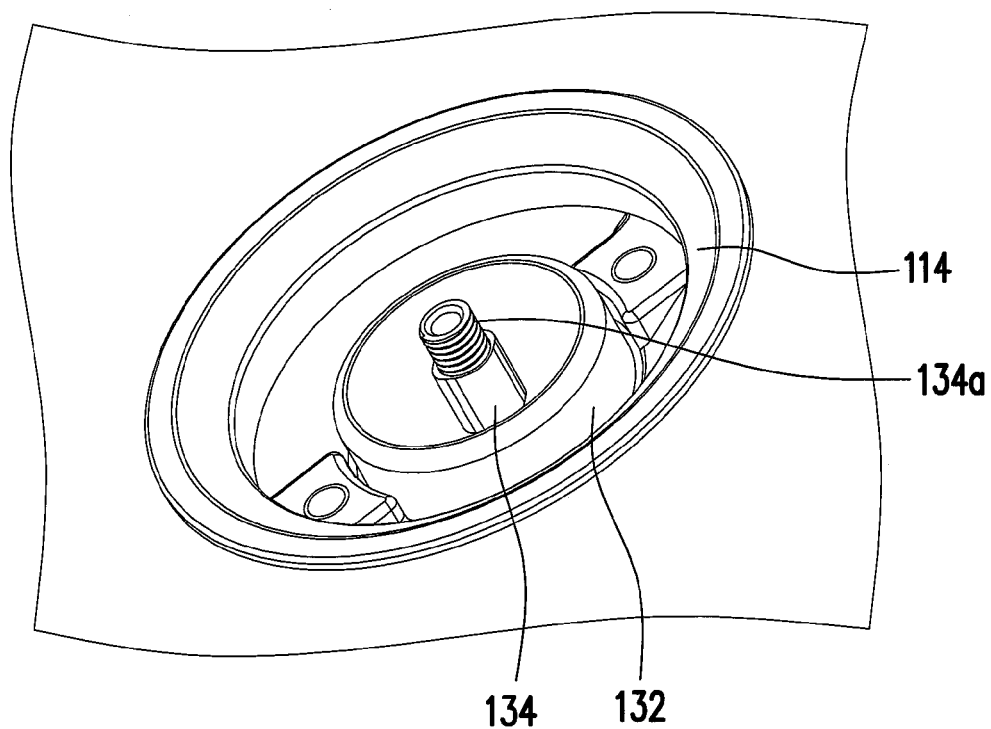
FIG. 7 is a three-dimensional view of a connection portion and a spherical socket of FIG. 3.
Figure 8:
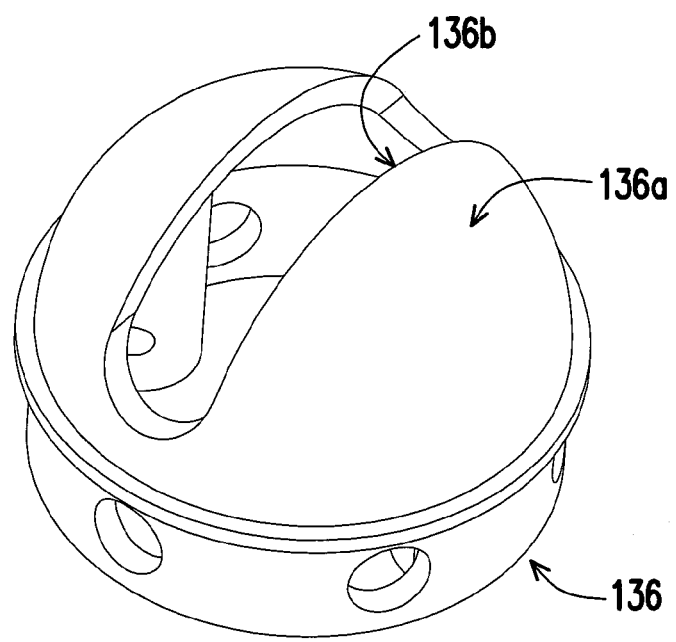
FIG. 8 is a three-dimensional view of a rotation member of FIG. 3.

FIG. 7 is a three-dimensional view of a connection portion and a spherical socket of FIG. 3. FIG. 8 is a three-dimensional view of a rotation member of FIG. 3. Referring to FIG. 3, FIG. 7 and FIG. 8, the connection member 130 includes a spherical socket 132, a pillar 134, a rotation member 136 and a position limiting member 138. The spherical socket 132 is fixed on the connection portion 114, and the pillar 134 is fixed in the spherical socket 132. The rotation member 136 has a spherical surface 136a and a slot 136b on the spherical surface 136a, and is spherically connected to the spherical socket 132 through the spherical surface 136a. An end 134a of the pillar 134 has a thread, and passes through the rotation member 136 through the slot 136b. The position limiting member 138 is, for example, a nut, and is screw-locked to the end 134a and position-limits the rotation member 136 to the spherical socket 132. The second light source device 120 is fixed to the rotation member 136, and a light emitting angle thereof may be adjusted through relative rotation of the rotation member 136 and the spherical socket 132. As shown in FIG. 1, the second light source 120 has a driving lever 128, and the user may exert forces to the driving lever 128 to drive the second light source device 120 to rotate relative to the connection portion 114 through the connection member 130.

Figure 9:
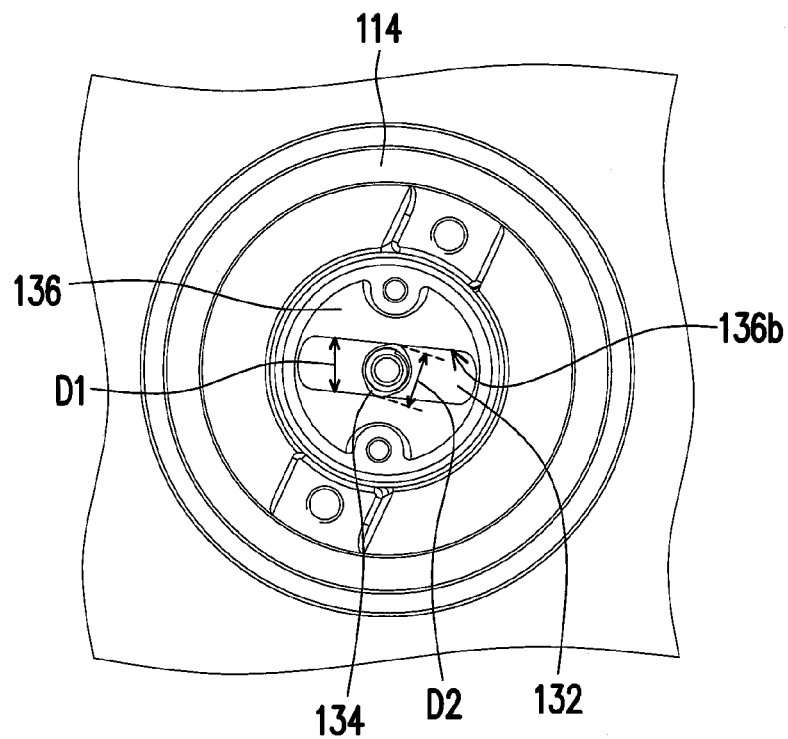
FIG. 9 is a top view of a part of components of the LED lamp of FIG. 1.

FIG. 9 is a top view of a part of components of the LED lamp of FIG. 1. Referring to FIG. 9, in the embodiment, a cross section of the pillar 134 is an ellipse. A width D1 of the slot 136b of the rotation member 136 is smaller than a long axis D2 of the ellipse, so as to limit a rotation range of the rotation member 136 relative to the pillar 134 to avoid breaking wires connected to the second light source device 120 due to excessive rotation angle of the second light source device 120.

Figure 10:
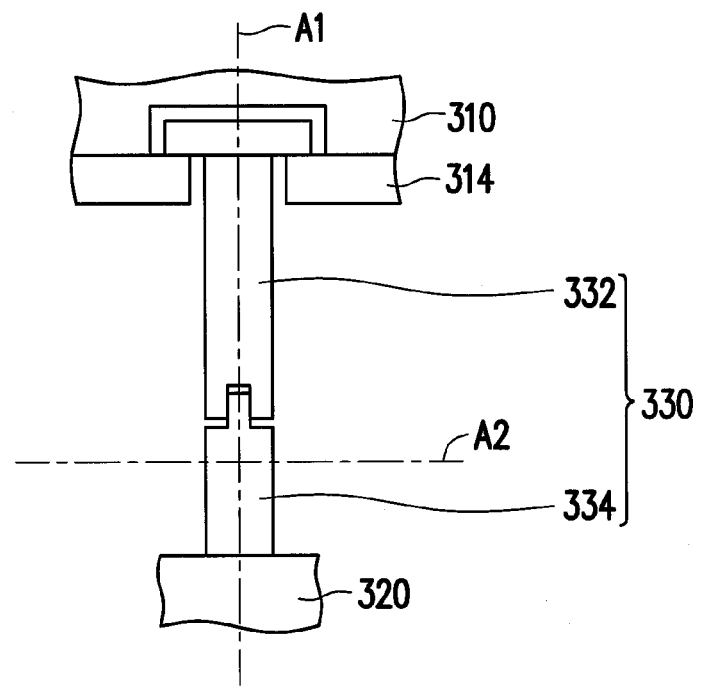
FIG. 10 is a partial schematic diagram of an LED lamp according to another embodiment of the invention.

A type of the connection member 130 is not limited by the invention, and another embodiment is provided below for description. FIG. 10 is a partial schematic diagram of an LED lamp according to another embodiment of the invention. Referring to FIG. 10, a connection member 330 of the embodiment includes a rotation member 332 and a rotation member 334. The rotation member 332 is pivoted to a connection portion 314 of a first light source device 310 along a first axis A1, and the rotation member 334 is pivoted to the rotation member 332 along a second axis A2 perpendicular to the first axis A1. A second light source device 320 is fixed on the rotation member 334, and a light emitting angle thereof is adjusted through relative rotation of the rotation member 332 and the connection portion 314 along the first axis A1 and relative rotation of the rotation member 334 and the rotation member 332 along the second axis A2.

In summary, the LED lamp of the invention has at least one of the following advantages:

In the above embodiment of the invention, the first light source device and the second light source device are respectively used to emit the first illumination light and the second illumination light. Therefore, a single lamp may have an effect of emitting two illumination lights, so as to save a configuration space of the lamp and simplify a circuit layout.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A light-emitting diode (LED) lamp, comprising:
  a first light source device, having a light exiting surface and a connection portion, for emitting a first illumination light through the light exiting surface, wherein the light exiting surface surrounds the connection portion, the first light source device is a direct-under type divergent light source device, and the first light source device comprises a base body, a diffusion plate disposed on the base body, and at least one LED light source disposed in the base body, wherein the LED light source is capable of emitting the first illumination light, and the first illumination light is transmitted to external through the diffusion plate; and
  a second light source device, connected to the connection portion, for emitting a second illumination light.

2. The LED lamp as claimed in claim 1, wherein the first illumination light and the second illumination light are different in at least one of a light shape, a color temperature, and a color.

3. The LED lamp as claimed in claim 1, wherein the second light source device is a light convergent light source device, and the second light source device comprises:
  a casing, connected to the connection portion;
  a light convergent lens, disposed on the casing; and at least one LED light source, disposed in the casing, wherein the LED light source is capable of emitting the second illumination light, and the second illumination light is transmitted to external through the light convergent lens.

4. The LED lamp as claimed in claim 1, further comprising a universal joint connected between the connection portion and the second light source device.

5. The LED lamp as claimed in claim 4, wherein the universal joint comprises:
a spherical socket, fixed on the connection portion;
a pillar, fixed in the spherical socket;
a rotation member, having a spherical surface and a slot on the spherical surface, wherein the rotation member is spherically connected to the spherical socket through the spherical surface, one end of the pillar passes through the rotation member through the slot, and the second light source device is fixed on the rotation member; and
a position limiting member, fixed on the end of the pillar, and position-limiting the rotation member to the spherical socket.

6. The LED lamp as claimed in claim 5, wherein a cross section of the pillar is an ellipse, and a width of the slot is smaller than a long axis of the ellipse, so as to limit a rotation range of the rotation member relative to the pillar.

7. The LED lamp as claimed in claim 4, wherein the universal joint comprises:
a first rotation member, pivoted to the connection portion along a first axis; and
a second rotation member, pivoted to the first rotation member along a second axis perpendicular to the first axis, wherein the second light source device is fixed on the second rotation member.

8. A light-emitting diode (LED) lamp, comprising:
a first light source device, having a light exiting surface and a connection portion, for emitting a first illumination light through the light exiting surface, wherein the light exiting surface surrounds the connection portion, the first light source device is a side-type divergent light source device, and the first light source device comprises a base body, a light guiding plate disposed in the base body wherein the light guiding plate has a hole, and the hole exposes the connection portion, a diffusion plate covering the light guiding plate; and at least one LED light source disposed in the base body and located at a side of the light guiding plate, wherein the LED light source is capable of emitting the first illumination light, and the first illumination light is transmitted to external through the light guiding plate and the diffusion plate in sequence; and
a second light source device, connected to the connection portion, for emitting a second illumination light.

9. The LED lamp as claimed in claim 8, wherein the first illumination light and the second illumination light are different in at least one of a light shape, a color temperature, and a color.

10. The LED lamp as claimed in claim 8, wherein the second light source device is a light convergent light source device, and the second light source device comprises:
a casing, connected to the connection portion;
a light convergent lens, disposed on the casing; and
at least one LED light source, disposed in the casing, wherein the LED light source is capable of emitting the second illumination light, and the second illumination light is transmitted to external through the light convergent lens.

11. The LED lamp as claimed in claim 8, further comprising a universal joint connected between the connection portion and the second light source device.

12. The LED lamp as claimed in claim 11, wherein the universal joint comprises:
a spherical socket, fixed on the connection portion;
a pillar, fixed in the spherical socket;
a rotation member, having a spherical surface and a slot on the spherical surface, wherein the rotation member is spherically connected to the spherical socket through the spherical surface, one end of the pillar passes through the rotation member through the slot, and the second light source device is fixed on the rotation member; and
a position limiting member, fixed on the end of the pillar, and position-limiting the rotation member to the spherical socket.

13. The LED lamp as claimed in claim 12, wherein a cross section of the pillar is an ellipse, and a width of the slot is smaller than a long axis of the ellipse, so as to limit a rotation range of the rotation member relative to the pillar.

14. The LED lamp as claimed in claim 11, wherein the universal joint comprises:
a first rotation member, pivoted to the connection portion along a first axis; and
a second rotation member, pivoted to the first rotation member along a second axis perpendicular to the first axis, wherein the second light source device is fixed on the second rotation member.

15. A light-emitting diode (LED) lamp, comprising:
a first light source device, having a light exiting surface and a connection portion, for emitting a first illumination light through the light exiting surface, wherein the light exiting surface surrounds the connection portion;
a second light source device, connected to the connection portion, for emitting a second illumination light; and
a universal joint connected between the connection portion and the second light source device, wherein the universal joint comprises:
a spherical socket, fixed on the connection portion;
a pillar, fixed in the spherical socket;
a rotation member, having a spherical surface and a slot on the spherical surface, wherein the rotation member is spherically connected to the spherical socket through the spherical surface, one end of the pillar passes through the rotation member through the slot, and the second light source device is fixed on the rotation member, wherein a cross section of the pillar is an ellipse, and a width of the slot is smaller than a long axis of the ellipse, so as to limit a rotation range of the rotation member relative to the pillar; and
a position limiting member, fixed on the end of the pillar, and position-limiting the rotation member to the spherical socket.

16. The LED lamp as claimed in claim 15, wherein the first illumination light and the second illumination light are different in at least one of a light shape, a color temperature, and a color.

17. The LED lamp as claimed in claim 15, wherein the first light source device is a direct-under type divergent light source device, and the first light source device comprises:
a base body;
a diffusion plate, disposed on the base body; and
at least one LED light source, disposed in the base body, wherein the LED light source is capable of emitting the first illumination light, and the first illumination light is transmitted to external through the diffusion plate.

18. The LED lamp as claimed in claim 15, wherein the first light source device is a side-type divergent light source device, and the first light source device comprises:
   a base body;
   a light guiding plate, disposed in the base body;
   a diffusion plate, covering the light guiding plate; and
   at least one LED light source, disposed in the base body and located at a side of the light guiding plate, wherein the LED light source is capable of emitting the first illumination light, and the first illumination light is transmitted to external through the light guiding plate and the diffusion plate in sequence.

19. The LED lamp as claimed in claim 18, wherein the light guiding plate has a hole, and the hole exposes the connection portion.

20. The LED lamp as claimed in claim 15, wherein the second light source device is a light convergent light source device, and the second light source device comprises:
   a casing, connected to the connection portion;
   a light convergent lens, disposed on the casing; and
   at least one LED light source, disposed in the casing, wherein the LED light source is capable of emitting the second illumination light, and the second illumination light is transmitted to external through the light convergent lens.

21. The LED lamp as claimed in claim 1, wherein the light-emitting diode (LED) lamp further comprises a connection member, connected to the connection portion.

22. The LED lamp as claimed in claim 8, wherein the light-emitting diode (LED) lamp further comprises a connection member, connected to the connection portion.

\* \* \* \* \*